US010281178B2

(12) United States Patent
Bresson et al.

(10) Patent No.: US 10,281,178 B2
(45) Date of Patent: May 7, 2019

(54) COLD PRODUCTION APPARATUS, INCLUDING MEANS FOR CONDENSATION BY AIR AND WATER SIMULTANEOUSLY, AND THE METHOD FOR IMPLEMENTING SAID FACILITY

(71) Applicant: Regandsy & Hates sàrl, Strassen (LU)

(72) Inventors: Loïc Bresson, Massiac (FR); Jean-François Sailhan, Massiac (FR); Denis Portal, Brioude (FR)

(73) Assignee: SYRAH S.A., Luxembourg (LU)

( * ) Notice: Subject to any disclaimer, the term of this patent is extended or adjusted under 35 U.S.C. 154(b) by 0 days.

(21) Appl. No.: 15/327,878

(22) PCT Filed: Jul. 22, 2015

(86) PCT No.: PCT/EP2015/066766
§ 371 (c)(1),
(2) Date: Jan. 20, 2017

(87) PCT Pub. No.: WO2016/012501
PCT Pub. Date: Jan. 28, 2016

(65) Prior Publication Data
US 2017/0198950 A1    Jul. 13, 2017

(30) Foreign Application Priority Data

Jul. 22, 2014  (LU) .......................................... 92502

(51) Int. Cl.
*F25B 25/00*  (2006.01)
*F25B 41/04*  (2006.01)
(Continued)

(52) U.S. Cl.
CPC .............. *F25B 25/005* (2013.01); *F25B 5/02* (2013.01); *F25B 6/04* (2013.01); *F25B 41/04* (2013.01);
(Continued)

(58) Field of Classification Search
CPC .. F25B 25/005; F25B 5/02; F25B 6/04; F25B 2700/21172; F25B 2400/0409; F25B 2700/195; F25B 2339/047
(Continued)

(56) References Cited

U.S. PATENT DOCUMENTS

2007/0246555 A1\*  10/2007  Nishimura ................ F24D 3/08
237/2 B
2014/0260376 A1\*  9/2014  Kopko ..................... F25D 3/005
62/99

FOREIGN PATENT DOCUMENTS

WO        2007146050 A2    12/2007
WO    WO 2007146050 A2 \*  12/2007  .............. F25B 27/02
(Continued)

OTHER PUBLICATIONS

International Search Report dated Sep. 22, 2015 for parent PCT application PCT/EP2015/066766.
(Continued)

*Primary Examiner* — Frantz Jules
*Assistant Examiner* — Steve Tanenbaum
(74) *Attorney, Agent, or Firm* — James E. Walton

(57) ABSTRACT

The present invention relates to an apparatus including: firstly, —a cold production unit (U), having a line for the flow of a coolant (BC); —means for compressing (1), decompressing (4), and evaporating (5) said coolant; and —an air condenser (2) and a main water condenser (CEP). Said facility also includes an auxiliary water flow device that has a first water reception vessel and a second water reception vessel (20, 30). Said auxiliary device defines at least one so-called "water heating" or "water-based calorie removal" path, leading from the first vessel to the second vessel and including at least one main section (65) for removing calories via water and capable of engaging with a main section (7) for exchanging heat with the coolant in the main (Continued)

water condenser (CEP). Said auxiliary device also defines a second so-called "water cooling" path, leading from the second vessel to the first vessel and including at least one water cooling section (82, 92) in a heat exchanger (ECA, EVS).

14 Claims, 6 Drawing Sheets

(51) Int. Cl.
*F25B 5/02* (2006.01)
*F25B 6/04* (2006.01)

(52) U.S. Cl.
CPC . *F25B 2339/047* (2013.01); *F25B 2400/0409* (2013.01); *F25B 2700/195* (2013.01); *F25B 2700/21172* (2013.01); *Y02P 80/156* (2015.11)

(58) Field of Classification Search
USPC .............................................................. 62/79
See application file for complete search history.

(56) References Cited

FOREIGN PATENT DOCUMENTS

WO       2010056556 A1    5/2010
WO    WO 2010056556 A1 *  5/2010  ................ F25B 6/04

OTHER PUBLICATIONS

International Preliminary Report on Patentability dated Jun. 27, 2016 for parent PCT application PCT/EP2015/066766.

\* cited by examiner

COLD PRODUCTION APPARATUS, INCLUDING MEANS FOR CONDENSATION BY AIR AND WATER SIMULTANEOUSLY, AND THE METHOD FOR IMPLEMENTING SAID FACILITY

The present invention relates to a facility for cold production and to an implementing process of this facility.

The invention relates more particularly, but not exclusively, to cold production for industrial or commercial use. The invention relates to the production of negative cold, that is to say at a temperature of less than 0° C., but also of positive cold, that is to say at a temperature above 0° C. and less than 20° C.

Usually, cold is produced by circulating a refrigerant fluid or a refrigerant along a circulation line generally extending in a closed loop. A compressor first directs the high-pressure refrigerant to a condenser, in which the refrigerant changes from the gaseous state to the liquid state and consequently releases calories. The cold is therefore produced, for the major part, during this condensing step.

The condensed refrigerant then passes through a pressure reducer, where it undergoes a pressure drop whilst remaining predominantly in the liquid state. The expanded refrigerant is then directed towards an evaporator where the liquid part of the refrigerant passes into the gaseous state and absorbs the calories present in the vicinity of this evaporator. The evaporated refrigerant is finally aspirated by the compressor, so that the cycle is renewed as often as it is necessary to obtain and maintain the desired temperature.

The invention relates more particularly to the condensing means used during the production of cold by a facility using a condenser.

A first known solution uses one or more air-cooled condenser(s), equipped with an internal coil in which flows a refrigerant, which is cooled by the peripheral air. This circulation may be static, when the air circulates by natural convection around the condenser. As an alternative, this circulation may be forced, through the use of one or more fans.

However, such a condenser has certain limitations, in particular when the cooling air has a high temperature. This may occur during the summer period, or when the cold production facility is in an industrial environment that generates a lot of heat, for example in the vicinity of cooking appliances and/or when the facility is in a confined space and not or poorly ventilated.

A second known solution uses one or more water-cooled condenser(s), in which the refrigerant is cooled by water through an exchanger. Typically, the refrigerant circulates at the periphery of tubes, in which the water is moved for heat exchange.

Such a water-cooled condenser helps overcome the disadvantages of the air-cooled condenser, since its efficiency is satisfactory even at high ambient temperature, that is to say above 25° C. However, this water-cooled condenser is expensive, particularly since it consumes large quantities of water.

U.S. Pat. No. 6,862,894 outlines a cold production facility, incorporating an air-cooled condenser combined with a water-cooled condenser. Depending on the refrigerant pressure, the water-cooled condenser is activated to provide a support to the air-cooled condenser. For this purpose, condensation water may flow in the condenser. However, this document does not provide additional information about the management of this condensation water.

That being said, the invention aims to improve the prior art, in accordance with the teaching of U.S. Pat. No. 6,862,894, mentioned above. In particular, it aims at proposing a cold production facility, comprising condensing means both by air and by water, in which the condensation water is judiciously managed. Finally, the invention provides such a facility, which can be constructed conveniently either as a new facility or from an existing facility.

To this end, the subject of the invention is a cold production facility, comprising at least one cold production unit which comprises a main circulation loop for a refrigerant fluid or refrigerant, as well as, arranged in the flow direction of the refrigerant in the circulation loop:
  compressing means for the refrigerant,
  condensing means for the compressed refrigerant, comprising an air-cooled condenser and a main water-cooled condenser,
  expansion means for the compressed refrigerant,
  evaporating means for the expanded refrigerant, comprising a main evaporator,
characterized in that it further comprises an auxiliary water circulation system, which comprises at least one first water receiving tank, at least one second water receiving tank, this system defining at least a first path, known as a path of extraction of calories by water from the first tank to the second tank, the or each first path comprising at least one main section of extraction of calories by water, able to cooperate with a main section of heat exchange of the refrigerant in the main water-cooled condenser, this system further defining at least a second path, known as a path of cooling water, from the second tank to the first tank, the or each second path comprising at least one section (82, 92) for cooling the water in a heat exchanger.

In normal operation, both of air-cooled condensation and water-cooled condensation are used. In this case, it is possible, for example, to fix the intensity of the air-cooled condensation, by regulating that of the water-cooled condensation, as a function of the overall requirements of the system. The intensity of each of these two condensation types can also be varied.

Alternatively, the air-cooled condenser can be used, leaving the water-cooled condenser for a support use only. In this case, water-cooled condensation is also used, for example if the measurement of a refrigerant parameter is outside a predefined range of values. Typically, the measured parameter of the refrigerant is representative for its temperature within the circulation line. This parameter may, for example, be the actual temperature, but also the pressure.

The water-cooled condensing means are then activated. This activation corresponds to a modification of the running of the facility between an inactive configuration where the water-cooled condenser extracts substantially no calories from the refrigerant, and an active configuration where this water-cooled condenser extracts a significant fraction of these calories.

The inactive configuration may correspond to a situation in which the refrigerant does not flow in the water-cooled condenser. It is also possible to consider that the refrigerant flows into the condenser. In the latter case, the condenser may be empty of water, or it may contain water which does not extract calories, in particular because it is not flowing.

However, in the active configuration, the refrigerant circulates in the condenser and heat is extracted by the condensation water. Those skilled in the art may take into account various operating parameters for the purpose of an optimum extraction, in particular the flow rate and/or water temperature.

The invention provides a condensation by water, which may complement the condensation by air. In this way, the overall condensation is ensured efficiently, whatever the operating conditions. Under these conditions, the various mechanical elements of this unit can be constructed as close as possible to their nominal dimensioning.

As a result, the cost of manufacturing these components is reduced, as are their operating costs, which is advantageous in economic terms. The lifetime of these devices is also improved, while limiting the risk of leakage as the risk of overpressure is controlled.

According to the invention, cold water, referred to as "make-up water" or "complement", circulates in the water-cooled condenser, so as to extract calories from the refrigerant. The invention foresees to store this cold water in a first tank and then direct it towards a second tank after it has been reheated as it passes through the cold production unit.

In order to limit the overall consumption of make-up water, the invention also foresees to return this make-up water to the first storage tank. However, a cold production facility is periodically stopped or in restricted operation, particularly at night when it equips a home, offices or industrial premises. The invention then advantageously foresees to flow the make-up water from the first to the second tank during the period of operation, and then to return this water from the second tank to the first tank during the suspension or restricted operation period.

It is also advisable to cool the hot make-up water returned from the second storage tank before re-admitting it into the first storage tank so that it can again be used in the refrigeration loop. The invention foresees to perform this cooling as judiciously as possible, depending on, in particular, the external and internal temperatures. It is possible, for example, to use the fresh external air to cool this water, and/or the refrigerant during its evaporation in the refrigeration unit or any other heat exchanger.

It will also be noted that, according to the invention, the first storage tank and the second storage tank can be merged into a single tank. Under these conditions, the paths between one tank and another are assimilated to loops around this single storage tank.

In the present description and claims, the terms "cold" and "hot" are not related to a predetermined temperature value. They are defined for a given path of make-up water, between the two storage tanks. Still expressed, the water is said to be "cold" or "cooled" at the outlet of an exchanger, because initially "warm" water has just yielded calories in this exchanger. Similarly, water is said to be "warm" or "reheated" at the outlet of an exchanger, because initially "cold" water has just recovered calories in this exchanger.

According to advantageous but not mandatory aspects of the invention, such a facility may comprise one or more of the following characteristics:

The first path also comprises a secondary section for extracting calories by water suitable for cooperating with a secondary section for exchanging heat of the refrigerant in a secondary water-cooled condenser, these two water-cooled condensers being disposed of on both sides of the air-cooled condenser.

The first path also comprises a cooling section for the superheated water, the temperature of which is greater than a predefined threshold, the said section extending in an air heat exchanger.

The second path comprises an air cooled section extending into an air heat exchanger.

The production unit comprises a derived evaporating line pricked on the main loop, this said derived line defining a secondary circulation loop and comprising a secondary evaporating section of the refrigerant, the water cooler path comprising a section of cooling by the refrigerant capable of cooperating with this secondary evaporation section.

The invention also relates to a process for implementing the above facility, in which refrigerant is circulated along the main circulation loop so as to produce cold; Cold water is circulated from the first tank along the first path and calories are removed from the refrigerant circulating in the main heat exchange section by means of this cold water flowing in the main calories extraction section; The heated water, coming out of the main heat extraction section, is sent to the second tank along the first path; Then the heated water is sent back from the second tank to the first tank along the second path, and the reheated water is cooled by circulating it at least once through at least one water cooler section.

According to advantageous but not mandatory aspects of the invention, such a process may comprise one or more of the following characteristics:

The water is recycled from the downstream to the upstream side of the main water-cooled condenser until a value representative for the refrigerant pressure, downstream of the main water-cooled condenser falls below a value threshold.

A threshold temperature of the water is estimated and the water is cooled by circulating it one or more times in the air-cooled section until the temperature of the water passes below this threshold.

A threshold temperature of water is estimated, the refrigerant is circulated in the secondary loop and the water is cooled by circulating it in the refrigerant-cooled section so that the temperature of the water falls below this threshold, The water is circulated one or more times in the air-cooled section and this water is then circulated in the refrigerant-cooled section before admitting this water into the first tank.

The invention will be better understood and other advantages thereof will appear more clearly on reading the following description given by way of non-limiting example and made with reference to the following drawings, in which.

Figure 1:
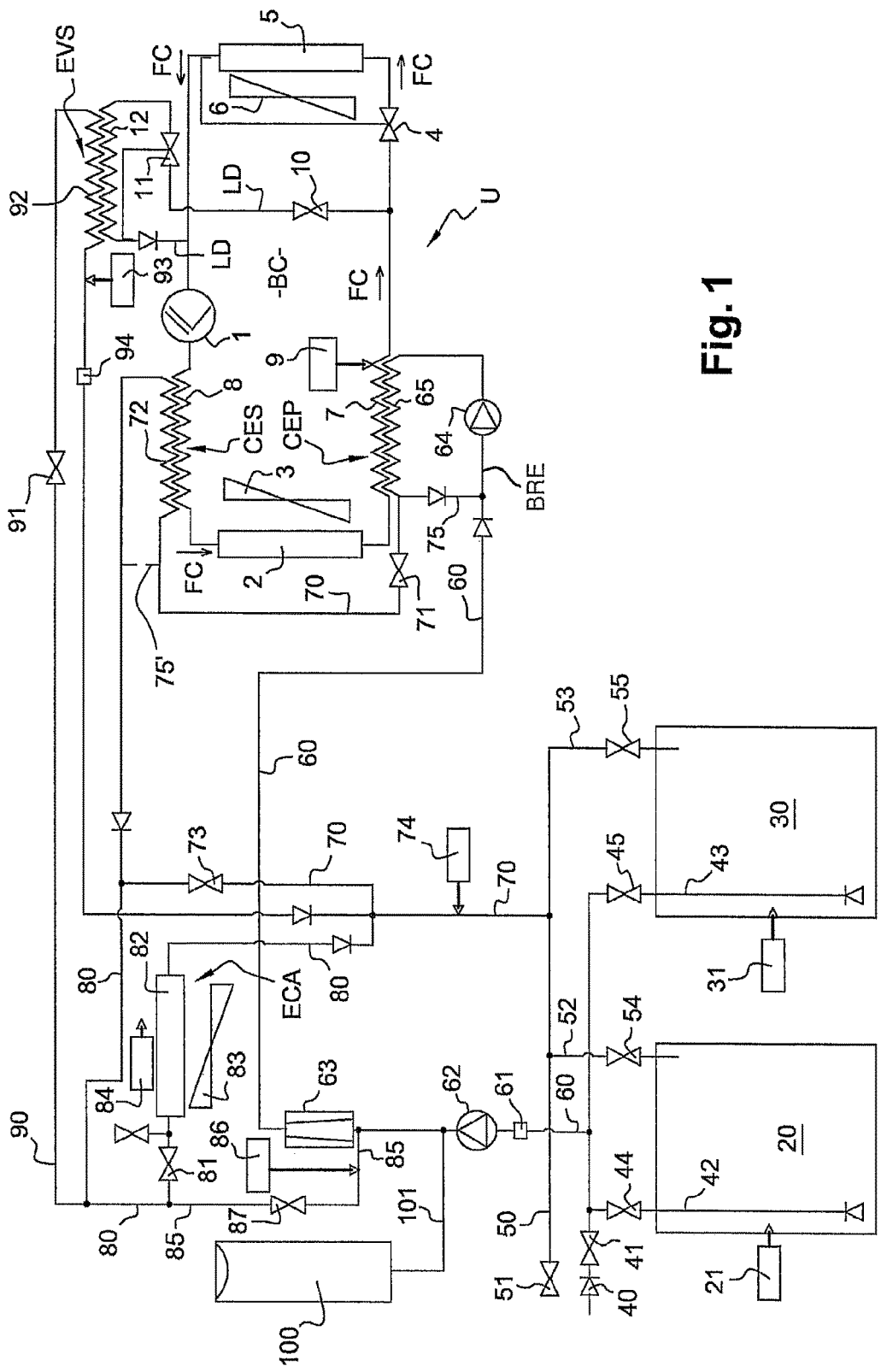
FIG. 1 is a schematic view illustrating a cold production facility according to the invention.

The cold production facility according to the invention comprises firstly a cold production unit of a previously known type per se. This unit, which is illustrated in FIG. 1 where it is assigned the reference U, comprises first of all mechanical elements which are known per se and whose structure will not be described in greater detail below, and which consist of:

A closed-loop circulation line BC, within which flows a refrigerant fluid, also known as refrigerant, of any suitable type. The progress of the refrigerant in the loop BC, indicated by the arrows FC, takes place in the opposite direction of the needles of the clock in the example. This progress is simplistically illustrated but can be adapted to more complex refrigeration systems;

A compressor 1 for circulating and pressurizing the refrigerant;

An air-cooled condenser 2, associated with a fan 3, provided immediately downstream of the compressor, with reference to the flow direction of the refrigerant;

An expansion valve 4, which is placed downstream of the air-cooled condenser 2, as well as a water-cooled condenser described in more detail hereinafter;

A main evaporator 5, which is placed downstream of the expander 4, associated with its fan 6 or any other evaporation system.

According to the invention, the circulation loop BC is equipped with two heat exchange sections, in which the refrigerant is exchanged for heat with make-up water, which is intended in particular for the condensation of this refrigerant. A first exchange section 7, which will form a main water-cooled condenser as it will be seen in what follows, is interposed between the air-cooled condenser and the expander. A pressure sensor 9 is provided immediately downstream of this section 7, with reference to the flow of the refrigerant. A second exchange section 8, which will form a secondary water-cooled condenser as it will be seen in what follows, is interposed between the compressor and the air-cooled condenser.

In addition, the circulation loop BC defines a bypass line LD, a first end of which leads to the exchange section 7 and the expander 4, while its other end leads to the main evaporator 5 and the compressor 1. This bypass line which is fitted with valves 10 and 11, defines a heat exchange section 12, the role of which will be described in greater detail in what follows.

The facility according to the invention further comprises a water circulation system, which first comprises two storage tanks 20 and 30 equipped with respective temperature sensors 21 and 31. In order to control the temperature of the water they receive, the storage tanks are advantageously thermally insulated by any suitable means. They can also be buried, totally or partially. These tanks 20 and 30 are made, for example, of metallic material. By way of indication, their capacity is for example between 50 and 800 000 liters.

A main suction pipe 40, associated with a valve 41, is connected to a source of water (not shown). This pipe 40 divides into two branch pipes 42 and 43, equipped with respective valves 44 and 45, which lead to the tanks 20 and 30.

A main discharge pipe 50, associated with a valve 51, is connected to the sewer. This pipe 50 is divided into two branch pipes 52 and 53, equipped with respective valves 54 and 55, which lead to the tanks 20 and 30.

The water circulation system also comprises a pipe 60, referred to as the water inlet, which is plugged into the pipe 43. This pipe is successively equipped with a flow sensor 61, a pump 62, a pressure regulator 63 and a circulator 64. It then leads to a heat exchange section 65 cooperating with the section 7 of the circulation loop so as to form a CEP main water-cooled condenser.

By way of non-limiting example, the internal volume of this condenser is equipped with a multiplicity of tubes constituting the exchange section 7, tubes in which the water circulates. The refrigerant can circulate at the periphery of these different tubes, in the exchange section 65, so as to extract the calories produced during the compression of this refrigerant.

Downstream of the exchange section 65, with reference to the normal flow of water, there is provision for a return pipe 70 extending in the direction of the pipe 53. This return pipe 70 is provided with a valve 71 and then defines a so-called downstream heat exchange section 72, cooperating with the exchange section 8 so as to form a secondary water-cooled condenser CES. The pipe 70 is further equipped with an additional valve 73 and a temperature sensor 74.

A recycling portion 75 connects the return line 70, between the upstream exchange section 65 and the valve 71, with the inlet pipe 60, upstream of the pump 64. This section thus defines a water recycling loop BRE, allowing this water to make several transits in the CEP condenser, as it will be seen in what follows.

A duct 80 called "cooling by air" is plugged into line 70 on both sides of valve 73. It is provided with a valve 81 and defines a heat exchange section 82, which extends into an ECA air heat exchanger of a previously known type per se. Advantageously, this heat exchanger is disposed judiciously, so as to guarantee an optimum exchange with the ambient air. This exchanger is equipped with its fan 83, as well as with an air temperature sensor 84.

In addition to that, a connecting portion 85 connects the air cooling duct 80 and the inlet duct 60. This connecting section is pitted, at one end, between the pump 62 and the pressure regulator 63 and, at the other end, in the vicinity of the valve 81. This portion 85 is equipped with a pressure switch 86, as well as a valve 87.

A pipe 90 said "for cooling by the refrigerant" extends between the pipe 80 in the vicinity of the valve 81 and the pipe 70 at its junction with this pipe 80. This pipe 90 is equipped with a valve 91, and then defines a heat exchange section 92 suitable for cooperating with that section 12 defined by the bypass line LD. These sections 12 and 92 define an EVS secondary exchanger for the refrigerant. Downstream of this section 92, with reference to the normal operation, this pipe is furthermore provided with a temperature sensor 93 and with a flow sensor 94.

Finally, the facility comprises an overpressure balloon 100, of a previously known type per se, whose role is to maintain a constant pressure without the pump returning to operation. This balloon is associated with a connecting line 101, which is plugged into the pipe 60, between the pump 62 and the pressure regulator 63.

Figure 2:
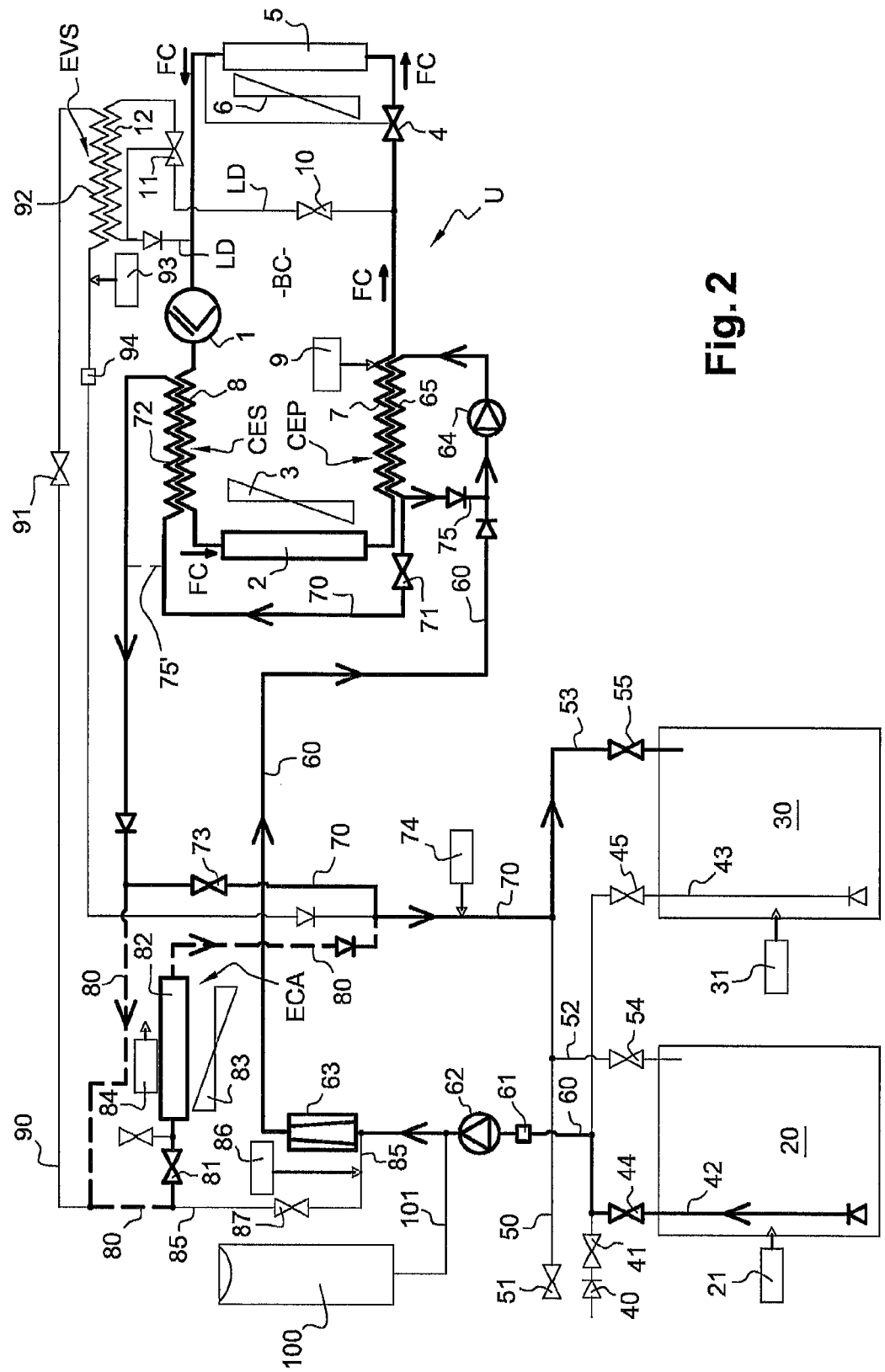
FIG. 2 to FIG. 6 are schematic views, illustrating different operating phases of the facility of FIG. 1.

Several ways of implementation of the facility, described above, will now be explained in the following. It is initially assumed that water has been admitted to the tank 20. This so-called cold water is typically at a temperature of between 5 and 25° C. In FIG. 2 and following, when the water flows along a mechanical element, the main flow is shown in solid lines and the optional flow is shown in broken lines, arrows representing the direction of these flows. However, the other mechanical elements, water not running through, are illustrated in broken lines.

FIG. 2 illustrates the situation where the facility must operate in daytime air conditioning or refrigeration mode, the outside temperature being in a usual range. The production unit U is operating, a refrigerant is circulated along the circulation line BC, according to the arrows FC. This circulation is carried out in the usual manner and will not be described in greater detail in what follows.

In order to implement the condensation of the refrigerant, it is chosen to use both the air-cooled condenser 2, as well as the water-cooled condensers CEP and CES. In this case, for example, a constant reduced power is fixed to this air-cooled condenser. In this way, this air-cooled condenser can be dimensioned in a reduced manner, while its consumption and noise nuisance are also limited. In addition to the air-cooled condenser, it is therefore convenient to extract calories from the refrigerant via the make-up water flowing in these condensers CEP and CES.

For this purpose, this water flows out of the tank 20, along the lines 42 and 60, until the exchange section 65. This water then extracts the calories from the refrigerant flowing in the other exchange section. In parallel, a parameter of the refrigerant, representative of its temperature inside the circulation line, is measured immediately downstream of the condensing stage. This parameter may, for example, be the actual temperature, but also the pressure measured via the sensor 9.

As long as the value measured by the sensor 9 is outside a predefined setpoint range, the water is sent back to the condenser along the recycling loop BRE in order to continue the extraction of calories. Then, when this measured value is within this range, the recycling of the water is stopped and it is directed downstream of the main condenser CEP along the pipe 70.

By way of an indicative and non-limiting example, the flow rate of the condensation water is between 20 l/h and 50000 l/h. Its temperature in the line 60, upstream of the exchange section 65, is between 5 and 40° C., while its temperature in the line 70, downstream of this same exchange section, is between 30 and 80° C. Furthermore, the temperature of the refrigerant upstream of the exchange section 7 is between 25 and 60° C., while its temperature, downstream of this same exchange section, is between 25 and 35° C. These temperatures are variable, in particular as a function of the nature of the refrigerant used.

The make-up water then flows into the second heat exchange section 72, where it extracts calories from the refrigerant, which flows into the exchange section 8, inside the condenser CES. Downstream of this section 72, the water has a temperature typically comprised between 40 and 70° C. It is then returned to the second tank along the pipe 70, as shown in solid lines in FIG. 2.

However, it is now assumed that this water has, downstream of the section 72, a temperature above a predetermined threshold, for example close to 43° C. This may be due to the fact that the outside temperature is high, or because of a high heat exchange in the CEP and CES condensers.

In this case, this superheated water is advantageously sent to the air-cooling duct 80, as shown in chain-dotted lines in FIG. 2. This water circulates in particular in the exchange section 82 in the heat exchanger ECA, so that its temperature is lowered. This avoids, in particular, any degradation to the material constituting the second tank 30.

As the unit U operates, the water is gradually transferred from the tank 20 to the tank 30. A low level sensor (not shown) may, if necessary, command the admission of additional water via the valve 41. At the end of the day, the tank 20 is practically empty, while the tank 30 is practically full. A possible overflow of the tank 30 is avoided if a high level sensor, not shown, detects an excessively high water level, so that it then commands the stopping of the water flow.

As can be seen from the foregoing, FIG. 2 explains a first path of water as a part of the invention, in which there is recovery, storage and extraction of calories by water. For the sake of concision, in the appended claims, this path is referred to as calorie extraction by water. This path comprises successively, in the way of implementation described in solid lines, the pipes 70 and 80, as well as the heat exchange section 65. In the way of implementation in mixed lines, this first path further comprises the pipe 80 of air cooling.

Figure 3:
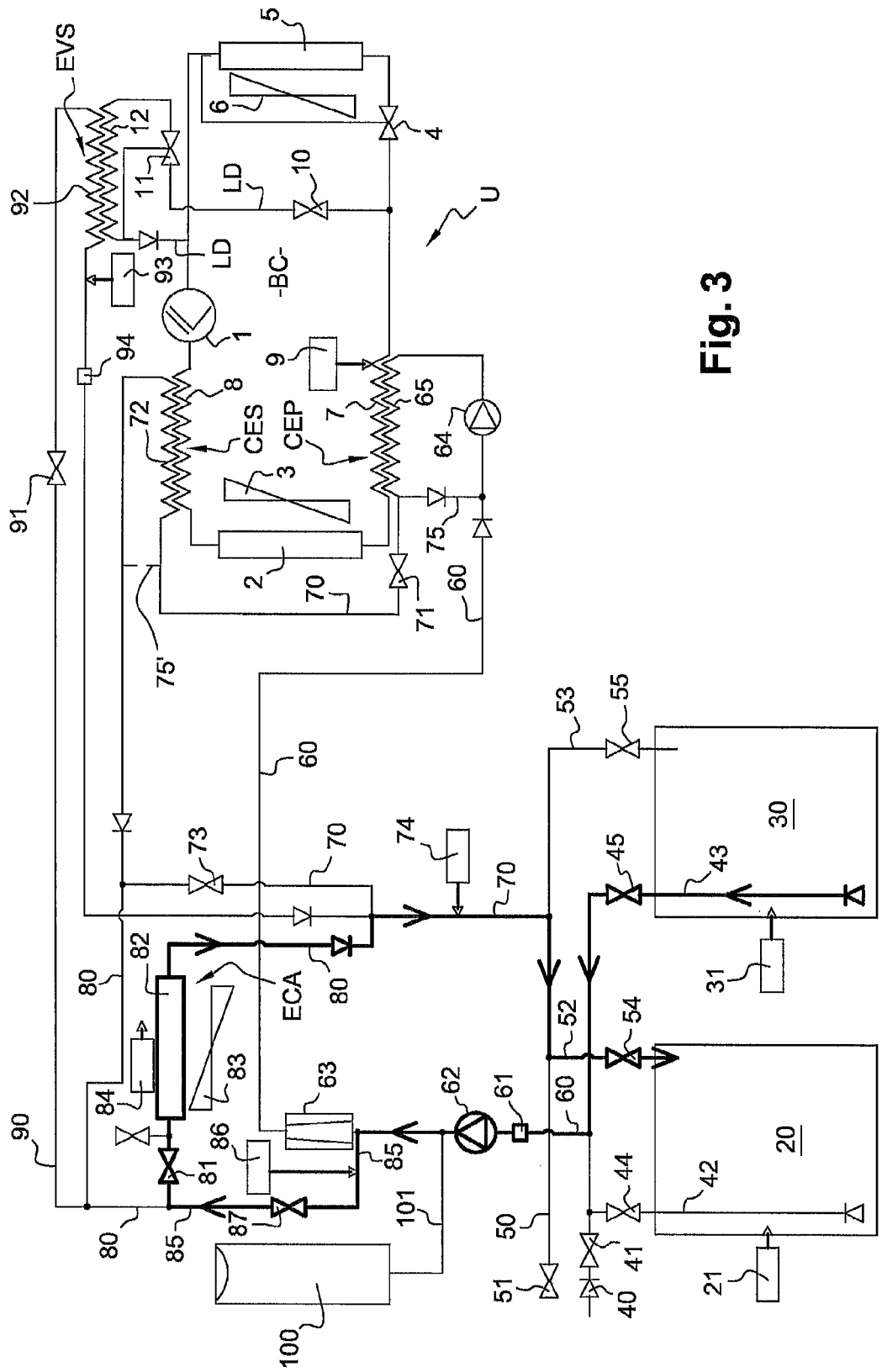

It is now assumed, with reference to FIG. 3 that the facility is in night-stop mode, or reduced operation. According to the invention, the hot water contained in the tank 30 is then returned in the direction of the tank 20. During this transfer between the tanks, the water is further cooled so as to have a temperature below a target threshold.

Indeed, the cooled water present in the tank 20 can be assimilated to a potential stock or reserve of frigories which can be used when the refrigeration unit must have additional condensation, typically during the next day. This quantity of stored frigories, which depends mainly on the temperature and volume of the water, must therefore be sufficient to meet the needs of the production unit.

According to the invention, this need for frigories is advantageously determined before returning the water from the tank 30 to the tank 20. This predetermined amount of cold is in particular a function of the temperature predicted for the following day. To this end, the facility according to the invention advantageously includes a control system for querying meteorological data and calculating this desired quantity.

This predetermined amount of frigories can also be a function of other parameters, in particular a particular need in terms of frigories independent of the outside temperature, or the desire not to use or to make little use of the air-cooled condenser. During the cold season, it may also be necessary to recover calories to produce hot water and/or heating. This predetermined quantity of frigories corresponds to a target temperature of the water, referred to as the threshold temperature, after the return of the water to the tank 20, along a cooling path. The water can be cooled in two ways, during this path from the tank 30 towards the tank 20, either by running through the air exchanger ECA or through the secondary exchanger EVS.

If the sensor 84 detects that the temperature of the outside air is much lower than that of the water present in the tank 30 as measured by the sensor 31, this water is extracted from the tank 30 and is then directed into the successive ducts 43, 60, 85 and 80 (see FIG. 3). It is then cooled in the exchanger ECA and then flows in the successive ducts 80, 70 and 52 so as to be admitted to the tank 20. This circulation of water corresponds to a so-called cooler path for this water, within the meaning of the invention.

The temperature of the water is then measured by the sensor 21 and compared with the target threshold, explained above. If this measured temperature is below this threshold, there is no additional circulation of water between the tanks. However, if the measured temperature is above the threshold, the water is further cooled by passing through the air heat exchanger.

Figure 4:
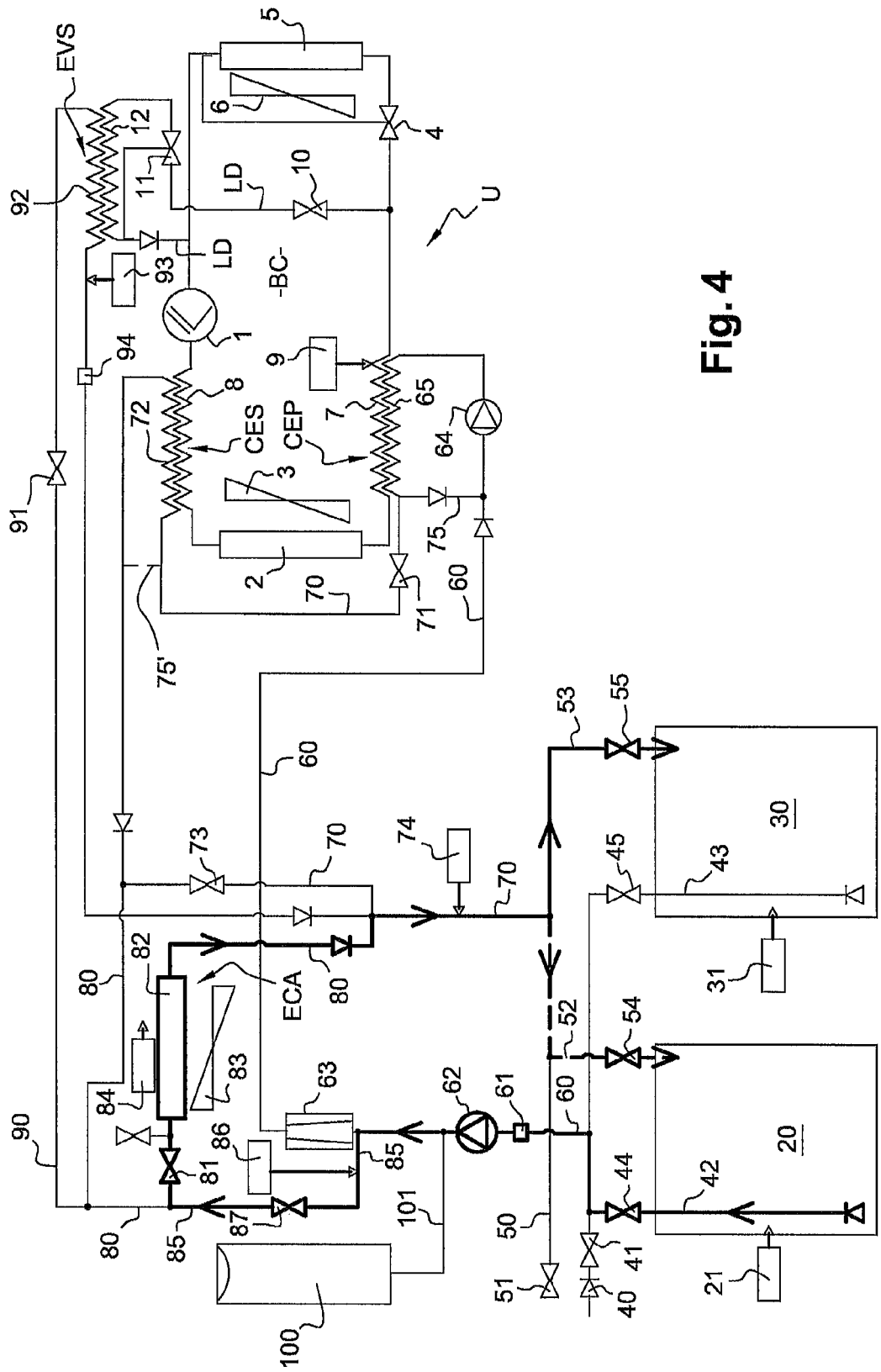

To this end, a first possibility is illustrated in solid lines in FIG. 4. The water flows from the tank 20 towards the tank 30 along the path opposite to that described in FIG. 3, via the exchanger ECA. It is then returned to the tank 20, according to the water cooling path illustrated in FIG. 3. The temperature of the water is then again measured and then compared with the threshold.

If this measurement is below the threshold, the circulation of the water is stopped. However, if this measured temperature is still above this threshold, the water flows along at least one additional round trip between the tanks 20 and 30 until its temperature falls below this threshold. At the end of this circulation, the water is therefore transferred from the tank 30 to the tank 20 by making an odd number of paths, namely a travel as illustrated in FIG. 3, as well as at least one round trip as illustrated in FIGS. 4 and 3.

As a variant, illustrated in solid and dashed lines in FIG. 4, the water is first extracted from the tank 20 and then cooled in the exchanger ECA. However, it is not directed towards the tank 30, but instead is returned directly towards the tank 20. The water flows one or more times through the exchanger, along this closed-loop cooling path, until its temperature is sufficiently lowered. The water is therefore transferred from the tank 30 to the tank 20, making a flow as illustrated in FIG. 3, and then as many loops as necessary around the tank 20 as illustrated in solid and dashed lines in FIG. 4.

Figure 5:
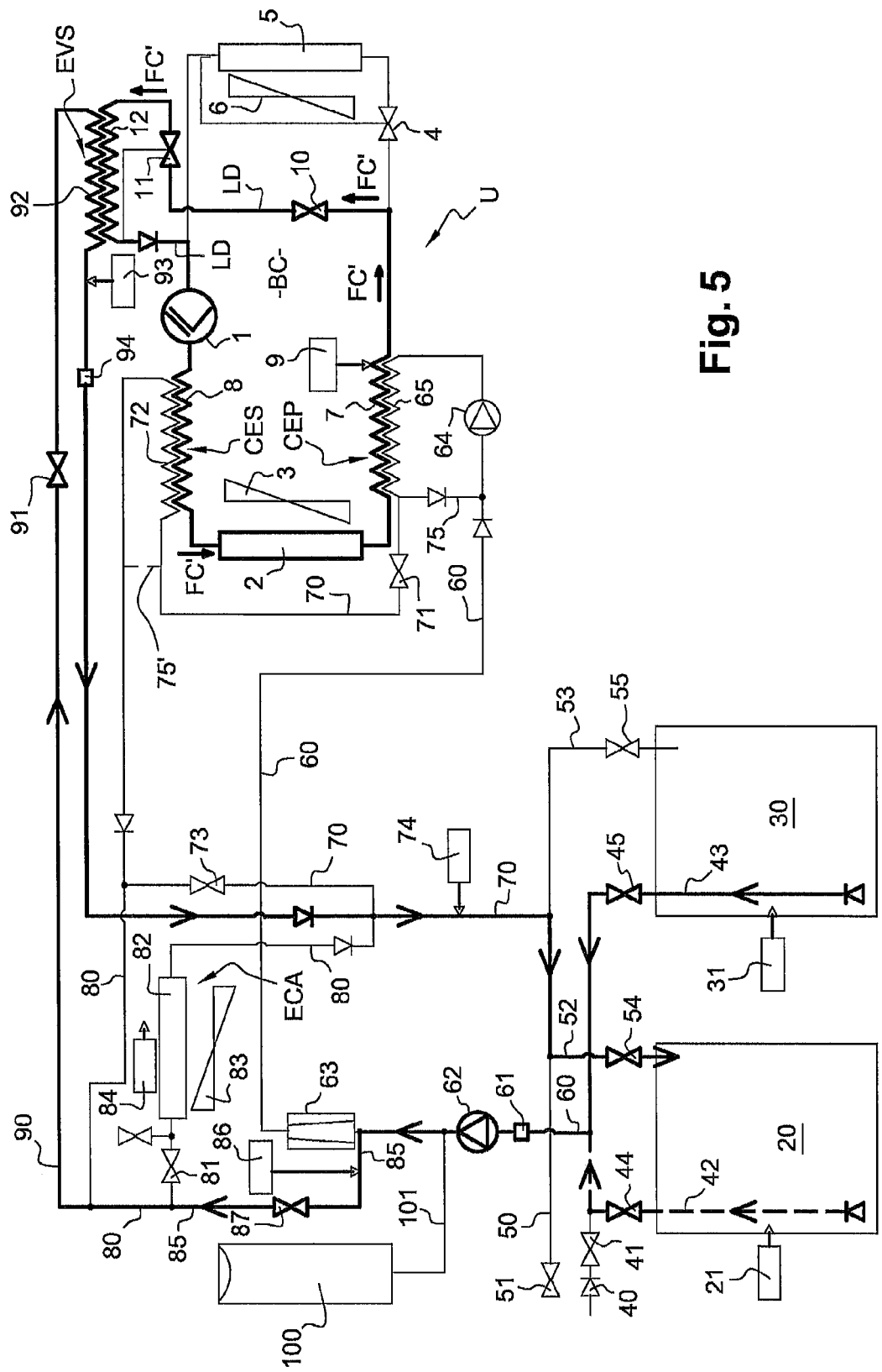
Figure 6:
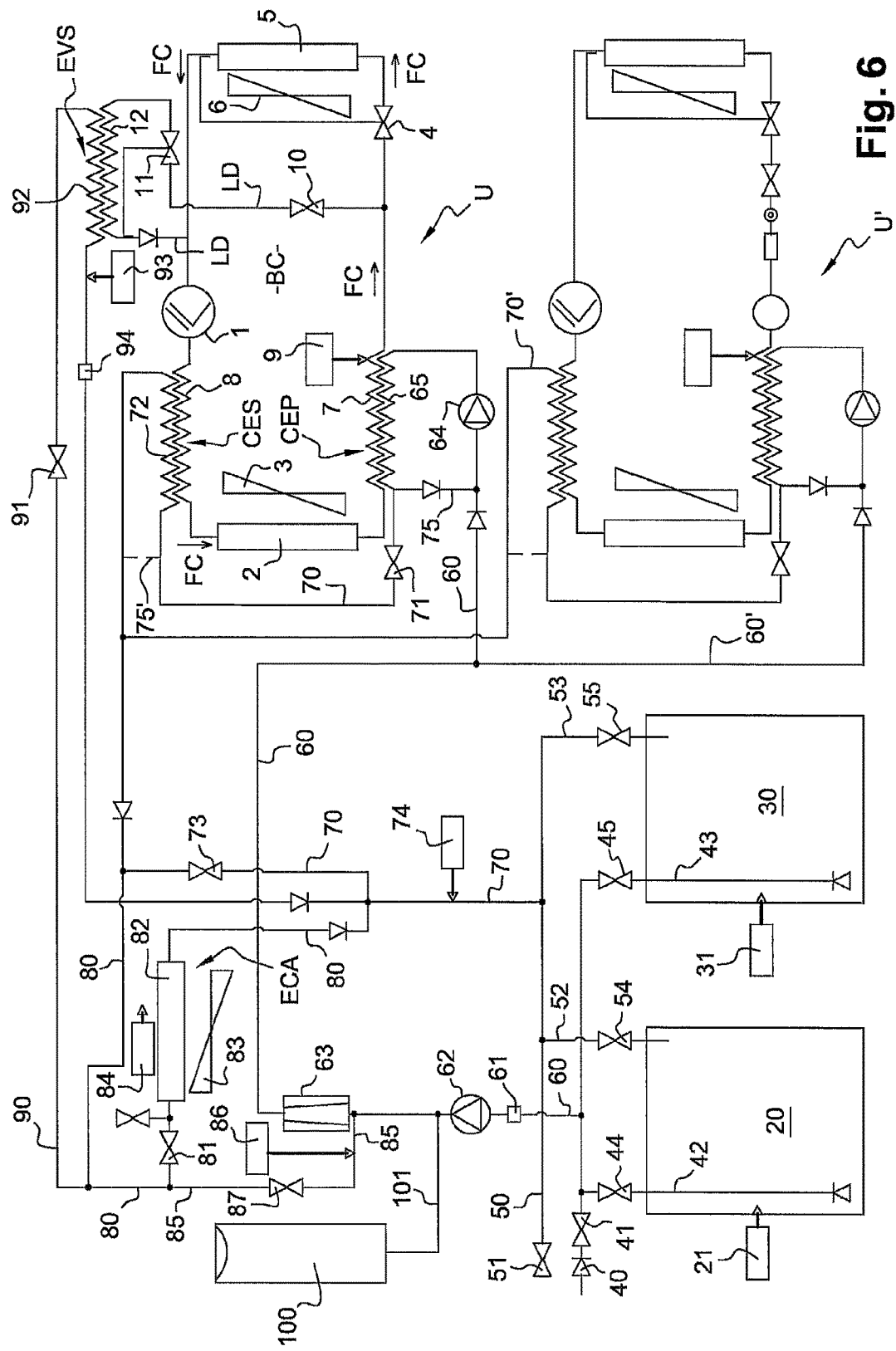

FIG. 5 illustrates a further variant of the invention, in which the water is cooled, not in the air exchanger, but in the exchange section 92 of the secondary exchanger EVS. The water is then put in heat exchange with the refrigerant, which is at a temperature typically between −5° C., and +5° C. The refrigerant flows in the unit according to the arrows FC', along a secondary loop including the derived line LD.

This mode of cooling the water, which is more efficient than the one achieved by running through the air exchanger, is implemented in particular in the following cases:
- when the temperature of the night air is too high for air cooling to be effective;
- when the need for frigories of make-up water is particularly high. This happens, for example, when the following day is announced as being particularly hot, or when the load is considered important;
- when the air exchanger is unavailable, for example in the case of a momentary breakdown.

This cooling is more costly than that performed by the air exchanger because it is necessary to run the production unit. Under these conditions, it is preferred to produce a single passage of the water in the secondary exchanger.

Typically, a first phase of the cooling of the water is carried out by means of the air exchanger ECA, according to the process described above. Then, at the end of a number of passages in this exchanger, a final phase of this cooling is implemented thanks to the secondary exchanger EVS. As a variant, especially if the air exchanger is unavailable, several passages are directly made in the secondary exchanger.

In the illustrated example, this secondary exchanger EVS is directly grafted onto the refrigerating unit U. However, as a variant not shown, provision may be made for grafting this secondary exchanger onto a separate refrigeration system specially dedicated to this function.

In more detail, if water is cooled by air according to the variant illustrated in solid lines in FIG. 4, the final cooling by exchange with the refrigerant is carried out during the last travel from the tank 30 to the tank 20. Water flows along the ducts 43, 60, 85 and 90, runs through the exchanger EVS, then flows along the ducts 90, 70, and 53, until the tank 20. It must be emphasised that the water follows the same path in the case where there is no cooling in the air exchanger, but only in the secondary evaporator. According to the meaning of the invention, this path constitutes a variant of the paths for cooling the water described above, extending through the air exchanger ECA.

However, if the water is cooled by air according to the variant illustrated in solid-dashed lines in FIG. 4, the final cooling by gas/water exchange is carried out during the last loop around the tank 1. The water is first extracted along the duct 42, as illustrated in solid-dashed lines. Then, as in the main variant, this water flows along the ducts 60, 85 and 90, runs through the evaporator EVS, then flows along the ducts 90, 70, 53 and 54, until the tank 20.

In the two possibilities described immediately above, the flow rate and the temperature of the refrigerant are chosen, so that the water shows a lower temperature than that aimed at, at the end of this final cooling phase.

As shown in the figures, the facility complying with the invention can comprise several cold production units, namely an additional unit U' similar to that U above. The make-up water can circulate in the vicinity of this unit U', so as to carry out additional condensation of the refrigerant. For this purpose, the water is sent to this unit U' via a pipe 60', plugged into the pipe 60, and then returned from this unit U' via a pipe 70', plugged into the pipe 70. It is also possible to provide d other additional units, arranged in parallel with those U and U'.

As an optional variant, it is possible to connect the ducts 70 and 80 by means of a recycling portion 75'. The latter, which is shown in dotted lines, is similar to that 75, but however may be lacking a valve. In this way, it is possible to circulate the water several times in the secondary condenser CES.

By way of variant (not shown), provision may be made for the first and second tanks to merge into a single storage tank. In this case, the pipes 42 and 43 merge into a single pipe, as are the pipes 52 and 53. The water paths, which are then loops around this single tank, are similar to those described above.

The invention claimed is:

1. A cold production facility, comprising:
   at least one cold production unit comprising:
   a main loop for circulating a refrigerant fluid, or refrigerant;
   compression means for the refrigerant;
   condensing means for the compressed refrigerant;
   expansion means for the compressed refrigerant;
   a main evaporator; and
   an auxiliary water circulation system for a calories extraction by water at the condensing means, the auxiliary water circulation system comprising:
   at least one first water storage tank;
   at least one second water storage tank;
   a first path for the calories extraction by water, from the first tank to the second tank, passing by the condensing means; and
   a second path for water cooling, from the second tank to the first tank, the second path comprising:
   at least one water cooling section in a heat exchanger;
   wherein the auxiliary water circulation system is designed and configured such that the first path and the second path are alternative paths for the water of the auxiliary water circulation system.

2. The facility according to claim 1, wherein the auxiliary water circulation system forms a closed circuit.

3. The facility according to claim 1, wherein the condensing means for the compressed refrigerant comprise:
   an air-cooled condenser; and
   a main water-cooled condenser with a main section of refrigerant heat exchange, the first path comprising:
   at least a main section of calories extraction by water, able to cooperate with the main section of the refrigerant heat exchange.

4. The facility according to claim 3, wherein the condensing means for the compressed refrigerant further comprise:
   a secondary water-cooled condenser with a secondary section of refrigerant heat exchange, the main water-cooled condenser and the secondary water-cooled condenser being arranged on both sides of the air-cooled condenser; and
   the first path further comprises:
   a secondary section of calories extraction by water, able to cooperate with the secondary section of the refrigerant heat exchange.

5. The facility according to claim 1, wherein the first path further comprises:

a cooling section for the water, when the temperature of the water is higher than a predefined threshold, said section comprising an air heat exchanger.

6. The facility according to claim 1, wherein the second path comprises:
an air-cooling section comprising an air heat exchanger.

7. The facility according to claim 1, wherein the cold production unit comprises:
an evaporation line plugged into the main loop, the evaporation line defining a secondary circulation loop of the refrigerant fluid and comprising:
a secondary evaporator, the auxiliary water circulation system comprising:
a refrigerant-cooling section able to cooperate with the secondary evaporator.

8. A process for cold production, comprising:
providing at least one cold production unit having a main loop for circulating a refrigerant fluid, or refrigerant, a compression means for the refrigerant, a condensing means for the compressed refrigerant, expansion means for the compressed refrigerant, a main evaporator for the expanded refrigerant, and an auxiliary water circulation system for the calories extraction by water at the condensing means;
providing the auxiliary water circulation system with at least one first water storage tank, at least one second water storage tank, a first path for the calories extraction by water from the first tank to the second tank passing by the condensing means, and a second path for water cooling, from the second tank to the first tank, wherein the second path includes at least one water cooling section in a heat exchanger, and wherein the first path and the second path are alternative paths for the water of the auxiliary water circulation system;
circulating refrigerant along the main circulation loop, so as to produce cold;
circulating cold water from the first tank along the first path and extracting calories from the refrigerant;
sending the initially cold and thereafter heated water to the second tank along the first path; and
sending heated water back from the second tank to the first tank along the second path;
whereby the heated water is cooled by passing at least once through the at least one water cooling section.

9. The process according to claim 8, wherein the water is sent to the second tank along the first path, and the water is returned from the second tank to the first tank along the second path at distinct operating times.

10. The process according to claim 8, wherein the water is sent to the second tank along the first path by day, and/or the return of the water from the second tank to the first tank along the second path takes place at night.

11. The process according to claim 8, further comprising:
providing the first path with a cooling section for the heated water, when the temperature of said water is higher than a predefined threshold, said section extending into an air heat exchanger; and
recycling the water from a downstream side to an upstream side of a main water-cooled condenser of the condensing means, until a value representative for the pressure of the refrigerant, at the downstream side of the main water-cooled condenser, falls below a threshold value.

12. The process according to claim 8, wherein a threshold temperature of water is estimated, and water is cooled by circulating it one or more times in the air-cooling section, until the water temperature falls below this threshold.

13. The process according to claim 8, wherein the cold production unit comprises an evaporation line plugged into the main loop, the evaporation line defining a secondary circulation loop of the refrigerant fluid and comprising a secondary evaporator, the auxiliary water circulation system comprising a refrigerant-cooling section able to cooperate with the secondary evaporator; and a threshold temperature of water is estimated, the refrigerant is circulated in the secondary loop, and the water is cooled by circulating it in the refrigerant-cooling section, so that the temperature of the water falls below this threshold.

14. The process according to claim 13, wherein the water is circulated one or more times in the air-cooling section, and is then circulated in the refrigerant-cooling section, before admitting the water into the first tank.

* * * * *